United States Patent [19]

Dumont et al.

[11] Patent Number: 5,277,837
[45] Date of Patent: Jan. 11, 1994

[54] METHOD AND COMPOSITION FOR TREATING FLUE OR EXHAUST GASES UTILIZING MODIFIED CALCIUM HYDROXIDE

[75] Inventors: Philippe A. Dumont, Auderghem; Robert Goffin, Trooz, both of Belgium

[73] Assignee: Lhoist Recherche et Developpement S.A., Belgium

[21] Appl. No.: 946,936

[22] Filed: Sep. 17, 1992

Related U.S. Application Data

[62] Division of Ser. No. 616,784, Nov. 21, 1990, Pat. No. 5,173,279.

[51] Int. Cl.$^5$ ............... C01B 7/00; C01B 17/00; B01J 8/00
[52] U.S. Cl. .................. 252/190; 252/192; 423/242.4; 423/242.7; 423/640; 423/244.07
[58] Field of Search ............... 252/190, 192; 423/242.4, 242.7, 244.07

[56] References Cited

U.S. PATENT DOCUMENTS 2,818,323  12/1957  Haensel ............... 252/190
4,424,197  1/1984  Powell et al. ............... 252/190

OTHER PUBLICATIONS

Chemical Abstracts, vol. 63, 1965, 6712g.

Primary Examiner—Robert L. Stoll
Assistant Examiner—Valerie Fee
Attorney, Agent, or Firm—Charles D. Gunter, Jr.

[57] ABSTRACT

A process is shown for treating flue or exhaust gases in order to remove sulfur oxides and hydrochloric acids in which calcium hydroxide having a surface area of at least 25 m$^2$/g and a moisture content lower than 50% is injected in the gases to be treated either alone, or in a mixture with magnesium hydroxide The calcium hydroxide used in the process is prepared by reacting quicklime or dolomitic quicklime with water in the presence of a glycol or an amine companion additive

6 Claims, No Drawings

METHOD AND COMPOSITION FOR TREATING FLUE OR EXHAUST GASES UTILIZING MODIFIED CALCIUM HYDROXIDE

This application is a division, of application Ser. No. 07/616,784, filed Nov. 21, 1990, now U.S. Pat. No. 5,173,279.

BACKGROUND OF THE INVENTION

1. Field of the Invention

The present invention relates generally to a method and composition for treating flue or exhaust gase to remove sulfur oxides and/or hydrochloric acids and, specifically, to a method in which a specially modified calcium hydroxide is brought into contact with the gases to be treated 2. Description of the Prior Art A wide variety of chemical processes, such as the burning of fossil fuels and metal ores, produce flue or exhaust gases (referred to herein as "off-gases") containing sulfur oxides and/or hydrochloric acids Because of environmental concerns, much attention has recently been devoted to the control of emissions from such processes, particularly fossil fuel combustion. Attention has been directed especially to systems which permit retrofitting of existing installations to avoid the capital investment required to construct new facilities.

One attempted solution to the above problem is the use of wet absorption processes, commonly referred to as wet scrubbing. Such processes are known for treating acid gases by contacting the acid gases with an aqueous suspension of calcium hydroxide. Such processes are described, for example, in U.S. Pat. Nos. 3,914,378; 3,919,394; and 4,164,549, among others. These reactional processes produce a sludge containing calcium sulfite or sulfate This sludge is a waste which is difficult to dewater, i.e., increase solids content, and to transport for further processing and/or disposal.

It is also known in the art to use "semi-dry" processes in which a calcium hydroxide suspension (milk of lime) is sprayed into the gases to be treated. When contacting the slurry with the hot gases to be treated, the suspension absorbs acid compounds and is dried. The by-product produced in this process is a fine, moist-to- dry powder. Despite this fact, the semi-dry process has, as a disadvantage, that it generally requires a substantial investment.

Because of the previously mentioned disadvantages, attention has been, focused on the direct injection of dry absorbent into exhaust or flue gases containing sulfur oxides and hydrochloric acids. See, for example, U.S. Pat. No. 4,555,392, which teaches the injection of limestone and the injection of portland cement downstream in the combustion gas stream of a fossil fuel burner. Injection equipment is well known and conventional. Downstream injection of a "dry" absorbent would eliminate the requirement of substantial new capital expenditure or the requirement of substantial down-time of the furnace or associated equipment being retrofitted.

To be suitable for the above purposes, the selected dry absorbent must, in addition to being available as a dry powder, be characterized by a high reactivity, high utilization potential and a high capacity to absorb acid gases, especially $SO_2$ and HCl, so that the powdered absorbent may be directly injected into the gases to be treated for obtaining a treatment which is both practical and efficient. Otherwise, the increase in the mass of solids to be separated from the off-gas stream, in most industrial processes, becomes impractical.

It has been observed that the capacity of calcium hydroxide powder to absorb acid gases is substantially proportional to its surface area (sometimes referred to as specific area) As a result, attempts have been made to find processes for preparing calcium hydroxide characterized by higher and higher surface areas.

In one known process, quicklime is slaked in the presence of methanol, thereby obtaining a calcium hydroxide having a surface area generally between 17 and 35 $m^2/g$. This manufacturing process is expensive and dangerous due to the production of methanol vapor. The bulk density, measured in $kg/m^3$, of the obtained hydrate is low (typically about 0.3) so that its transport from the production plant to the installation for treating gases is very expensive.

In another process, quicklime is slaked in the presence of calcium lignosulfonate. The calcium hydroxide which can be obtained by this process has a low relative surface area and its efficiency is therefore limited.

In still another process, powders of quicklime or dolomitic quicklime are hydrated with water, the water to quicklime/dolomitic quicklime ratio being between 2:1 and 5:1, before being dried. The substantially dry powder obtained in this manner is then stored and transported to the installation in which the powder is injected in exhaust gases to be treated. The drying is an expensive operation which requires the investment of a dryer. Drying also agglomerates the powder particles and reduces their reactivity. The transport of the dry powder, due to its low bulk density, is also very expensive.

It is an object of the present invention to provide a composition and method for treating exhaust gases which avoids the drawbacks of the above referenced known processes and which is especially adapted for dry injection of a absorbent powder into an off-gas stream to be treated.

Another object of the invention is to provide a modified calcium hydroxide which is characterized by a high reactivity, high utilization potential and a high capacity to absorb acid gases, especially $SO_2$ and HCl, so that the powdered absorbent may be directly injected into the gases to be treated for obtaining a treatment which is both practical and efficient.

Another object of the invention is to provide a method for preparing a calcium hydroxide suitably modified for the purposes of the present invention, at the site of utilization, without requiring expensive dryers, large storage vessels, and expensive transport.

SUMMARY OF THE INVENTION

In the method of the invention, a process is provided for treating off-gases in order to remove acid compounds, such as sulfur oxides or hydrochlohydric acid. In the method, a specially modified calcium hydroxide having a surface area greater than 25 $m^2/g$, and a moisture content lower than 50%, is injected into the off-gases to be treated.

Preferably the calcium hydroxide which is injected into the gases has a surface area greater than 40 $m^2/g$ and a moisture content between about 5% and 20%.

Applicants have prepared such a calcium hydroxide, which can be mixed also with magnesium hydroxide, by reacting quicklime or dolomitic quicklime with water in the presence of an additive selected from the group consisting of amines and glycols. The especially preferred amines and glycols are selected from the group consisting of ethyleneglycol, diethyleneglycol, triethyleneglycol, monoethanolamine, diethanolamine, triethanolamine and the mixtures thereof. During the slaking operation, the ratio of water to quicklime or dolomitic quick is preferably between about 0 6:1 and 2:1 and, most preferably, between about 0 7:1 and 1.5:1 so that a calcium hydroxide with a moisture content lower than 50% is obtained without any drying operation. The weight ratio of additives to quicklime or dolomitic quicklime is preferably between about 0.001:1 and 0.02:1, most preferably between about 0.005:1 and 0.015:

The order of adding the ingredients is not critical in the thus described method. For instance, it is possible to add the additives to the water and then to use the water for slaking quicklime or dolomitic quicklime or to slake quicklime or dolomitic quicklime which has previously been coated with the additives.

Preferably, the specially modified calcium hydroxide, which can also be mixed with magnesium hydroxide, has a temperature greater than 70° C. when injected in the off-gases to be treated.

Additional objects, features and advantages will be apparent in the written description which follows.

DETAILED DESCRIPTION OF THE INVENTION

In the method of the invention, off-gases are treated for the removal of sulfur oxides, chlorides and/or other acid compounds by injecting into the off-gas stream a dry absorbent material which comprises a specially modified calcium hydroxide. The specially modified calcium hydroxide (CaO or calcium hydroxide-magnesium hydroxide CaO-MgO) has a surface area of at least 25 $m^2/g$, a moisture content lower than 50% and preferably a temperature greater than 70° C. at the time it is injected into the gases to be treated.

The preferred, specially modified calcium hydroxide used in the method of the invention has a surface area of at least 25 $m^2/g$, preferably greater than 30 $m^2/g$, most preferably greater than 40 $m^2/g$, and a moisture content lower than 50% most preferably between about 5 and 20%.

The specially modified calcium hydroxide used in the practice of the present invention can be prepared by reacting quicklime or dolomitic quicklime with about 0.6 to 2.0, preferably 0.7 to 1.5, and most preferably about 0.8 to 1.1 parts by weight of water per part by weight of quicklime or dolomitic quicklime in the presence of about 0.001 to 0.02, preferably 0.005 to 0.015 parts by weight of a companion additive per part by weight of quicklime or dolomitic quicklime.

The water that is employed in the method of the invention may be any of the water from economical and normally employed sources. Conventional sources include city water mains, lakes, streams, and the like. Preferably, the water will not have a high concentration of materials that will react with the lime used to form the specially modified calcium hydroxide.

The lime that is employed in the practice of the method of the invention can be a conventional quicklime, or calcium oxide. The quicklime can be either dolomitic or high calcium lime; although high calcium lime is most often used. The lime that is employed may have minor amounts of other impurities therein but will ordinarily analyze better than about 90% by weight calcium oxide. Quicklime is available from a number of commercial sources in the form of small pellets which are on the order of $\frac{1}{4}''$ to $\frac{1}{2}''$ in diameter.

The companion additive is a glycol or an amine, the preferred companion additives being selected from the group consisting of ethyleneglycol, diethyleneglycol, triethyleneglycol, monoethanolamine, diethanolamine, triethanolamine, and mixtures thereof.

The following examples are intended to be illustrative of the invention, without being limiting in the scope thereof;

TEST PROCEDURE

A test was conducted for treating flue gases from a thermal station (power 2.5 MW) in which coal having a sulfur weight content of 1.4% is burned. The station included a burner with a grate on which coal was burned, a heat exchanger for recovering heat of the gases coming from the burner, cyclones for removing fly ash from the gases and a column in which calcium hydroxide was injected for removing $SO_2$ or HCl from the flue gases. The column was located between the heat exchanger and a bag house filter for the recuperation of solid particles such as remaining calcium hydroxide, calcium derivatives, such as calcium sulfate, dust, and the like. The flue gases contained from 1600 to 1900 (mean value 1800) mg $SO_2/m^3$.

For the tests relating to the removing of HCl from the flue gases, coal with a very low sulfur weight content was burned and HCl was injected in the burner so as to obtain flue gases with 1450–1800 mg $HCl/m^3$ (mean value : 1600 mg $HCl/m^3$).

In each of the tests, the total gas flow of the station was between 3200 and 4900 N $m^3/h$. The contact of the flue gases with the injected calcium hydroxide in the column was at a temperature of about 115° C. The contact time between the flue gases and the injected calcium hydroxide (in the column and in the filter) was between about 3.7 and 5.6 seconds. The $SO_2$ and HCl contents of the flue gases were measured before and after contact with calcium hydroxide.

Assuming that $[HCl]_o$ and $[SO_2]_o$ are the HCl and $SO_2$ contents of the flue gases before treatment, and $[HCl]_f$ and $[SO_2]_f$ are the HCl and $SO_2$ contents of the flue gases after treatment, the yields in % may then be calculated by the following formulae.

$$\frac{[HCl]_o - [HCl]_f}{[HCl]_o} \times 100 \text{ for the dechlorination}$$

$$\frac{[SO_2]_o - [SO_2]_f}{[SO_2]_o} \times 100 \text{ for the desulfurization}$$

The yield of the treatment depends on the amount of calcium hydroxide used with respect to the amount of $SO_2$ or HCl present in the flue gases, i e. on the molecular ratio of Ca:S or Ca:2HCl. Molecular ratios of 1:1, 2:1 and 3:1 were used in the following tests.

In the tests which follow, the following calcium hydroxides were used for comparative purposes:

Calcium hydroxide A

Ground quicklime was reacted with an amount of water corresponding to a ratio of water to quicklime of 0.58:1. The starting quicklime had a typical moisture content of 0.8% and a surface area of 17 $m^2/g$. The calcium hydroxide as well as the vapor produced during the slaking were injected at a temperature of 90°–100° C. into the flue gases.

Calcium hydroxide B

Ground quicklime was slaked with 0.5 parts by weight of water per part of quicklime in the presence of 0.004 part by weight of diethyleneglycol per part of quicklime. The so obtained calcium hydroxide had a surface area of 25 m$^2$/g and was injected, together with the vapor produced during the slaking, at a temperature of 90°-100° C. into the gases to be treated

Calcium hydroxide C

Ground quicklime was slaked with 0.83 parts by weight of water per part of quicklime in the presence of 0.008 parts by weight of diethylene-glycol per part of quicklime.

The calcium hydroxide had a moisture content of 12% and a surface area of 46 m$^2$/g. The calcium hydroxide as well as the vapor produced during the slaking were injected at a temperature of 90°-100° C. into the flue gases.

Table I which follows gives the desulfurization yields as well as the dechlorination yields for the described tests:

TABLE I

| Calcium hydroxide | Desulfurization Yield (%) Ca:S | | | Dechlorination Yield (%) Ca:HCl | | |
|---|---|---|---|---|---|---|
| | 1:1 | 2:1 | 3:1 | 1:2 | 2:2 | 3:2 |
| A | 24 | 33 | 39 | 33 | 46 | 54 |
| B | 37 | 58 | 63 | 41 | 60 | 73 |
| C | 47 | 81 | 88 | 58 | 83 | 96 |

An additional benefit which is obtained through the use of glycols and/or amines during the slaking of quicklime or dolomitic quicklime is an increase in porosity of the resultant calcium hydroxide, as well as the diameter of the pores, so that occlusion of the pores during the absorption of SO$_2$ penetration into the calcium hydroxide is increased.

While the invention has been shown in only one of its forms, it is not thus limited but is susceptible to various changes and modifications without departing from the spirit thereof.

We claim:

1. A calcium hydroxide modified by an additive selected from the group consisting of ethyleneglycol, diethyleneglycol, triethyleneglycol, monoethanolamine, diethanolamine, triethanolamine and mixtures thereof, said calcium hydroxide being suitable for treating gases for removing therefrom undesirable compounds including sulfur oxides and hydrochloric acid, the calcium hydroxide being prepared by the process of slaking quicklime or dolomitic quicklime in presence of the said additive, the weight ratio of water to quicklime or dolomitic quicklime which is used in the preparation of the modified calcium hydroxide being in the range from about 0.6 to 2, while the weight ratio of the said additive to quicklime or dolomitic quicklime is comprised between 0.005:1 and 0.02:1, the calcium hydroxide so prepared being characterized as having a surface area of at least 35 m$^2$/g and a moisture content lower than 50%.

2. The specially modified calcium hydroxide of claim 1, wherein the quicklime or dolomitic quicklime which is reacted with water is in the form of particles coated with an additive selected from the group consisting of ethyleneglycol, diethyleneglycol, triethyleneglycol, monoethanolamine, diethanolamine, triethanolamine and mixtures thereof.

3. The calcium hydroxide of claim 1, wherein the calcium hydroxide so prepared is mixed with magnesium hydroxide to form a treatment mixture suitable for treating gases for removing undesirable compounds including sulfur oxides and hydrochloric acid.

4. The calcium hydroxide of claim 1 having a surface area of at least 40 m$^2$g and a moisture content in the range from about 5 to 50%.

5. A calcium hydroxide modified by an additive selected from the group consisting of ethyleneglycol, diethyleneglycol, triethyleneglycol, monoethanolamine, diethanolamine, triethanolamine and mixtures thereof, said calcium hydroxide being suitable for treating gases for removing therefrom undesirable compounds including sulfur oxides and hydrochloric acid, the calcium hydroxide being prepared by the process of slaking quicklime or dolomitic quicklime in presence of the said additive, the weight ratio of the said additive to quicklime or dolomitic quicklime being in the range of 0.005:1 to 0.02:1, while the weight ratio of water to quicklime or dolomitic quicklime being in the range from about 0.8:1 to 1.1:1, the calcium hydroxide having a surface area of at least 40 m$^2$/g and a moisture content lower than 50%.

6. The calcium hydroxide of claim 5 having a surface area of 46 m$^2$/g and a moisture content in the range from about 5 to 50%.

* * * * *